US011155328B1

(12) United States Patent
Hong et al.

(10) Patent No.: US 11,155,328 B1
(45) Date of Patent: Oct. 26, 2021

(54) AIR VEHICLE WITH A CONTROLLED BUOYANCY LIFTING SYSTEM AND METHOD THEREOF

(71) Applicants: Zongxuan Hong, Houston, TX (US); Royce Chen Hong, Houston, TX (US)

(72) Inventors: Zongxuan Hong, Houston, TX (US); Royce Chen Hong, Houston, TX (US)

( * ) Notice: Subject to any disclaimer, the term of this patent is extended or adjusted under 35 U.S.C. 154(b) by 561 days.

(21) Appl. No.: 16/121,093

(22) Filed: Sep. 4, 2018

(51) Int. Cl.
*B64B 1/64* (2006.01)
*B64B 1/20* (2006.01)
*B64B 1/30* (2006.01)
*B64B 1/62* (2006.01)

(52) U.S. Cl.
CPC ............. *B64B 1/20* (2013.01); *B64B 1/30* (2013.01); *B64B 1/62* (2013.01); *B64B 1/64* (2013.01); *B64B 2201/00* (2013.01)

(58) Field of Classification Search
CPC .... B64B 1/58; B64B 1/60; B64B 1/64; B64B 1/54; B64B 1/04; B64B 2201/00; B64C 37/02
See application file for complete search history.

(56) References Cited

U.S. PATENT DOCUMENTS

| | | | |
|---|---|---|---|
| 1,625,951 A * | 4/1927 | Lemon | B64B 1/58 244/30 |
| 3,970,270 A | 7/1976 | Pittet, Jr. | |
| 4,012,016 A | 3/1977 | Davenport | |
| 5,005,783 A | 4/1991 | Taylor | |
| 6,648,272 B1 | 11/2003 | Kothmann | |
| 6,848,647 B2 | 2/2005 | Albrecht | |
| 2005/0230526 A1 * | 10/2005 | Loustaudaudine | B64B 1/06 244/29 |

* cited by examiner

*Primary Examiner* — Nicholas McFall
*Assistant Examiner* — Terri L Filosi

(57) ABSTRACT

An air vehicle comprises a payload vessel, a propulsion system, and a buoyancy lifting unit anchored on said payload vessel. The buoyancy lifting unit comprises a plurality of balloons and a plurality of buoyancy gas reservoirs arranged in horizontal rows and vertical columns, a protractible rod, and a control system. Each of the balloons and buoyancy gas reservoirs is tethered to a lifting-joint on the protractible rod through a cable. The control system controls vertical move of the air vehicle to ascend through directing buoyancy gas flow from the buoyancy gas reservoirs into the balloons, and to descend through directing buoyancy gas flow from the balloons into the buoyancy gas reservoirs. The propulsion system controls horizontal move of the air vehicle to go forward and make turns.

16 Claims, 13 Drawing Sheets

AIR VEHICLE WITH A CONTROLLED BUOYANCY LIFTING SYSTEM AND METHOD THEREOF

FIELD OF THE INVENTION

The present invention relates to air vehicle. More particularly, the invention relates to air vehicle wherein the lifting force is achieved by buoyancy force from a plurality of individual balloons and buoyancy gas reservoir arranged in horizontal rows and vertical columns.

BACKGROUND

In general, most of current flying vehicles are of propeller lifting force design variants, for example, air plane, helicopter, drone, etc. Current propulsion devices, for example, powerful engines, are typically expensive, noisy, and require frequent specialized maintenance. The operations of these flying vehicles also require strict training. Furthermore, during flying journey, the operator usually requires constant contact with control center for safety and security reason. Some individuals utilizing these flying vehicles may still feel inherently vulnerable to catastrophic upset, such as loss of lift, engine failure, high speed collision with objects in air, or operation incident.

Buoyancy-assisted air vehicles are useful alternates to above fly vehicles utilizing propeller lifting force. The advantages of these air vehicles are in the aspect of vertical lift and runway-free operation, less energy requirements, quiet, and easy to operate among others. Currently, blimp and hot air balloons are practiced. However, the rigid shape and high volume of these air vehicles result in considerable operating limitations. These air vehicles also require significant lift gas management, results in an inconvenient and expensive mode of transport. In general, existing buoyancy lift-assisted air vehicles are still too large, cumbersome and slow for most aviation operations, especially for personal travel.

In prior arts, several attempts to solve these and other problems include the following:

U.S. Pat. No. 5,005,783, issued to Taylor, discloses a variable geometry airship that has a helium-filled flexible envelope and tighten-able adjusting lines which can be released.

U.S. Pat. No. 6,848,647, issued to Albrecht, discloses a buoyant and semi-buoyant/pressurized fluid stream jet vehicle that includes internal skeletal mechanisms which are modified to change their shape, and centralized control agents to manage vehicle functions.

U.S. Pat. No. 4,012,016, issued to Davenport, discloses an autonomous variable density aircraft which has a body formed by hinged rigid panels with flexible partitions forming interior compartments.

U.S. Pat. No. 3,970,270, issued to Pittet, Jr. discloses a light gas filled aircraft wing which has aerodynamic configuration wing element with cells filled with lighter than air gas.

And recently a step advance in design and operation of airship was disclosed in U.S. Pat. No. 6,648,272 B1, issued to Kothmann. The patent introduced a method to control vertical flight by moving buoyancy gas in and out of the gas bag. The buoyancy gas from the gas bag is stored within a hollow ring surrounding the gas bag.

However, most of the airships by those designs and operations disclosed in prior arts still have extensive limitations due to the complexity of the designs and giant space the airship occupied, making them impractical to utilize.

SUMMARY OF THE INVENTION

The objective of the present invention, which will be described subsequently in greater detail, is to provide a new air vehicle and method thereof for flight that is safe, economical, and easy to operate, and requires no ground infrastructure to use.

Another objective of the present invention is to provide an air vehicle that occupies less horizontal space as compared to conventional blimp or hot air balloon, so that it will be convenient to maneuver and park. In particular, the present invention relates to an air vehicle wherein the lifting force of said air vehicle is achieved by a buoyancy lifting system wherein a plurality of balloons and buoyant gas reservoirs are arranged in horizontal rows and vertical columns. Air vehicle ascending is controlled by expanding buoyancy gas into said balloons from buoyancy gas reservoirs, and air vehicle descending is controlled by extracting buoyancy gas from said balloons back into buoyancy gas reservoirs.

The present invention disclosed an air vehicle, comprising:
a) a plurality of individual balloons containing buoyancy gas arranged in horizontal rows and vertical columns, each said balloon tethered through a cable to a lifting-joint mounted on a pull-rod system;
b) a plurality of individual buoyancy gas reservoirs containing buoyancy gas arranged in horizontal rows and vertical columns, each said buoyancy gas reservoir tethered through a cable to a lifting-joint mounted on a pull-rod system;
c) a gas handling system connecting said balloon to said buoyancy gas reservoir, said gas handling system comprising tubings, valves, pressure sensors, pumps, and a control system;
d) a plurality of pull-rod systems, each said pull-rod system comprising a plurality of nested rods with lifting-joints, and said pull-rod system is anchored on a payload vessel of said air vehicle system;

said gas handling system controls air vehicle to ascend through directing buoyancy gas flow from buoyancy gas reservoirs into said balloons, or descend through directing buoyancy gas flow from said balloons back into said buoyancy gas reservoirs; said pull-rod system extends out by buoyancy force when said balloons are inflated, and folds up by gravity when said balloons are deflated.

In one embodiment of this invention, a payload vessel is for the operators and passengers to situate in. The payload vessel also houses gas handling system and control system.

In another embodiment of this invention, a propulsion system is attached to said payload vessel.

In a preferred embodiment of this invention, said payload vessel is aerodynamically-shaped to reduce air resistance during movement.

In a preferred embodiment of this invention; said payload vessel has wings for stabilization of said air vehicle.

In another embodiment of this invention, said payload vessel is equipped with a control system for operators to operate said buoyancy lifting system and said propulsion system to move said air vehicle in horizontal direction, vertical direction, and in combination thereof.

In another embodiment of this invention, said buoyancy lifting system comprises a plurality of balloons and buoyancy gas reservoirs arranged in horizontal rows and vertical columns.

In a preferred embodiment of this invention, said balloon and buoyancy gas reservoir are aerodynamically-shaped to reduce air resistance during movement.

In a preferred embodiment of this invention, said balloon and buoyancy gas reservoir are made of light-weight materials with no or little permeation of buoyancy gas. The materials can be polymeric type of materials such as nylon, PVC, HDPE, etc. The materials usually are made in thin films.

In a preferred embodiment of this invention, said balloon is wrapped by a woven fiber net and said cable is tethered to said woven fiber net; said woven fiber net is used to protect said balloon from over expanding and used as a force bearing device for buoyancy force lifting said payload.

In a preferred embodiment of this invention, said buoyancy gas reservoir is wrapped by a woven mesh screen to withhold high gas pressure inside said buoyancy gas reservoir and said cable is tethered to said woven mesh screen; said woven mesh screen is used to provide mechanical strength to withhold high gas pressure inside said buoyancy gas reservoir and used as a force bearing device for buoyancy force lifting said payload. The material of woven mesh screen is preferred to be strong in mechanical strength and light in weight, such as carbon fiber, or aluminum, etc. The preferred mesh of said woven mesh screen is over 100.

In another embodiment of this invention, said balloon contains a check valve connecting to a buoyancy gas inlet line and allowing only buoyancy gas to enter said balloon as inlet, and a second check valve connecting to a buoyancy gas outlet line and allowing only buoyancy gas inside said balloon to exit as outlet.

In another embodiment of this invention, said buoyancy gas reservoir contains an electrically actuated valve for buoyancy gas to exit an outlet valve, and a second electrically actuated valve for buoyancy gas to enter an inlet valve, wherein said electrically actuated valves are controlled by said control system.

In another embodiment of this invention, said buoyancy gas reservoir contains a pressure safety relief valve to prevent buoyancy gas pressure from going above a certain designed gas pressure.

In another embodiment of this invention, said payload vessel has a plurality of anchoring joints, and said pull-rod systems are anchored on said anchoring joints.

In a preferred embodiment of this invention, said anchoring joint is constructed to allow said anchored pull-rod system to swing back and forth, left and right at an angle to vertical direction.

In another embodiment of this invention, said pull-rod system comprises a plurality of nested rods, and each nested rod has lifting joints to tether said balloon or said buoyancy gas reservoir.

In a preferred embodiment of this invention, each section of said nested rod is tethered to said anchoring joint by a flexible cable.

In a preferred embodiment of this invention, said pull-rod system and nested rods are hollow shaped.

In another preferred embodiment of this invention, said pull-rod system extends out with buoyancy force when said balloons are inflated, and said pull-rod system folds up by gravity when said balloons are deflated.

In another embodiment of this invention, said balloon is individually tethered by a cable to said lifting joints on said pull-rod system and said buoyancy gas reservoir is individually tethered by a cable to said lifting joints on said pull-rod system.

In another embodiment of this invention, said balloon is connected to said buoyant gas reservoir via a gas handling system that is controlled by said control system for flow direction of buoyancy gas, said gas handling system comprises tubing, valves, pressure gauges and pumps, and said gas handling system is powered by an electrical power system.

In another embodiment of this invention, said balloon connects via one gas line used as inlet line for buoyant gas to enter said balloon, and connects via another gas line as outlet line for buoyant gas inside said balloon to return to said buoyant gas reservoir via said gas handling system.

In another embodiment of this invention, said balloon has a check valve in said inlet that only allows buoyancy gas to enter said balloon and prevent from buoyancy gas to back out through said inlet line, and said balloon has another check valve in said outlet that only allows buoyancy gas to exit said balloon and prevent from buoyancy gas to enter through said outlet line.

In a preferred embodiment of this invention, said check valve for the outlet line of said balloon has a small pressure drop for buoyancy gas to pass through, from 0.001 to 1 atm, preferably, from 0.001 to 0.1 atm, and said check valve for the outlet line also prevent buoyancy gas to leak out if the pressure drop across the valve is less than the thresh hold of said check valve.

In another embodiment of this invention, there is a pressure sensor in both inlet gas line and outlet gas line. Said pressure sensor signal is transmitted to said control system for gas handling purpose.

In another embodiment of this invention, said buoyancy gas comprises helium gas, or hydrogen gas, or a combination thereof.

Said buoyancy gas is administrated into said balloon via said inlet line via gas expansion from buoyancy gas reservoirs at high gas pressure. In this case, said air vehicle will ascend. The speed of ascending is dependent on the rate of buoyancy gas expansion into said balloons.

Said buoyancy gas is extracted from said balloon back into said buoyancy gas reservoir via said outlet line via said pumps in said gas handling system. In this case, said air vehicle will descend. The speed of descending is dependent on the rate of buoyancy gas extraction back into said buoyancy gas reservoir.

Said control system controls the flow direction and amount of buoyancy gas administrated into said balloon or extracted from said balloon based on the command by the operator to ascend or descend.

In another embodiment of this invention, said electrical power system is a battery system, and/or an electrical power system by solar energy.

In another embodiment of this invention, said propulsion system comprises a plurality of electric motors with propulsion propellers to move said air vehicle in various directions and make turns.

One advantage of the present invention is that the air vehicle of this invention takes much smaller horizontal space as compared to conventional blimp and hot air balloon based on the design that the buoyancy force is attained by using a plurality of smaller balloons arranged in vertical columns, thereby achieving the same buoyancy gas volume in an expanding vertical space but smaller horizontal space. The smaller horizontal space makes air vehicle movement in air more convenient and will have less influence with other air vehicles.

Another advantage of the present invention is the much-improved safety of air vehicle by using a plurality of balloons each individually tethered to the air vehicle. Safety of air vehicle is of prime importance. As compared to conventional blimp, hot air balloon, or other airship design in prior arts wherein airship buoyancy lifting force is solely dependent on one single buoyancy device, said buoyancy lifting system provides multiple individual buoyancy lift force to the whole air vehicle, each balloon providing a portion of buoyancy lifting force. This design will reduce the failure rate significantly because even if one or several balloons should fail, other balloons will still provide buoyancy lifting force to prevent a quick and sudden drop of said air vehicle.

Another advantage of the present invention is the low cost of said air vehicle as said air vehicle does not require powerful engine to provide lifting force of the whole air vehicle, and other equipment associated with conventional air planes.

Another advantage of the present invention is the low cost to operate. As compared to conventional blimp wherein the buoyancy gas helium is disposed of into air, gas handling system of this invention re-uses all the buoyancy gas by pumping buoyancy gas back into buoyancy gas reservoir. Another advantage of this design is that it allows said air vehicle to carry out multiple ascending and descending operations.

Another advantage of the present invention is that said air vehicle is easy to operate as the command of horizontal and vertical movements are controlled by separate propulsion system and buoyancy lifting system. Although said air vehicle moves a lot slower than conventional air plane, the slow speed feature of said air vehicle makes it easy to learn and operate.

Another advantage of the present invention is that use of flight requires no ground facilities. Said air vehicle can be used at many common places.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further objects and advantages of the present invention will be apparent from the following detailed description of a presently preferred embodiment which is illustrated schematically in the accompanying drawings.

BRIEF DESCRIPTION OF THE DRAWINGS

The accompanying drawings illustrate various embodiments of the principles described herein and are a part of the specification. The illustrated embodiments are merely examples and do not limit the scope of the claims. The elements in figures are not necessarily to absolute or relative scale. Further, the elements illustrated may have a variety of different configurations.

Throughout the drawings, identical reference numbers designate similar, but not necessarily identical, elements.

DESCRIPTION OF A PREFERRED EMBODIMENT

Figure 1:
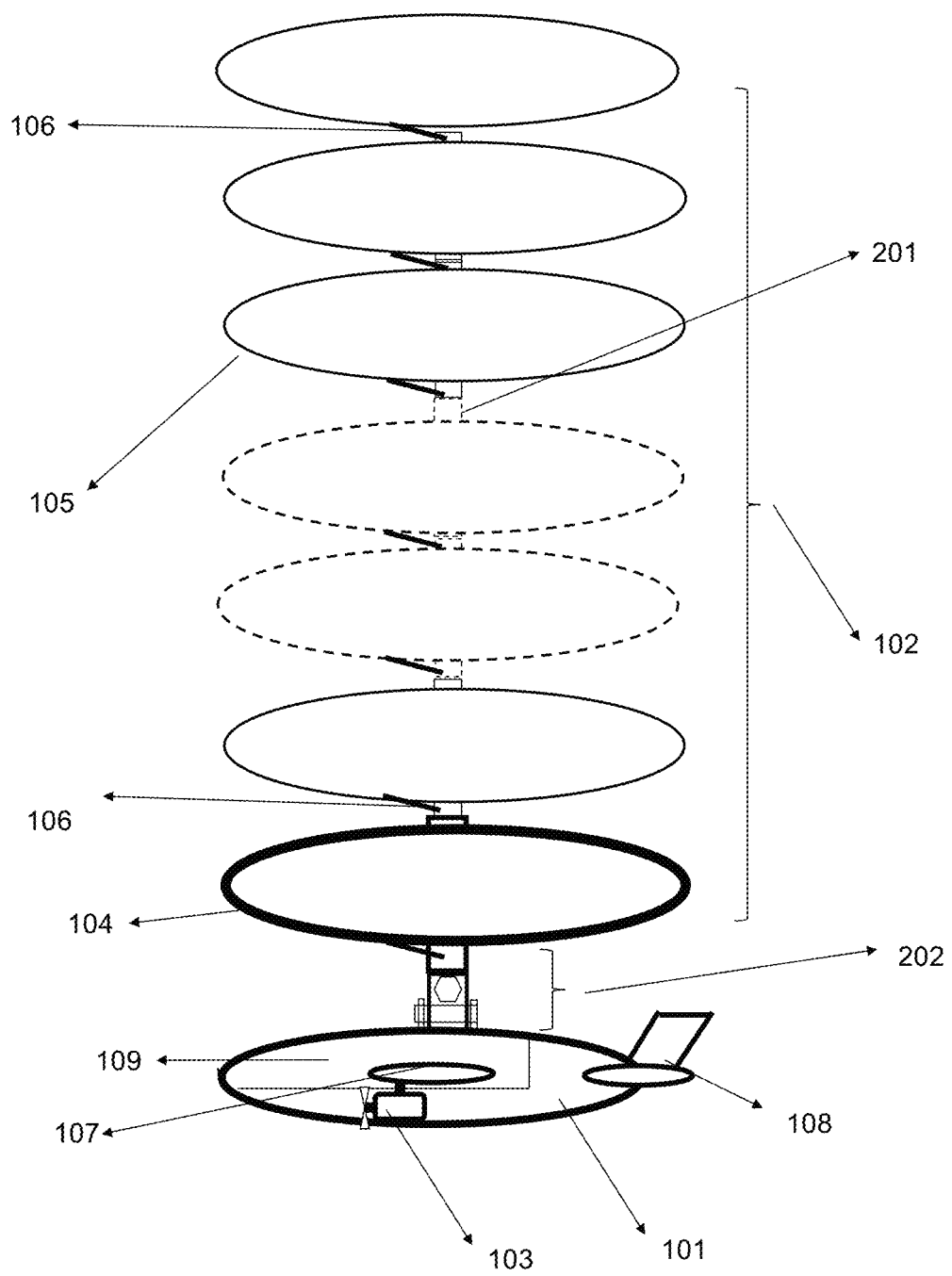
FIG. 1 is a schematic drawing of side view of an air vehicle of the present invention, showing air vehicle with (a) a payload vessel; (b) a buoyancy lifting system, wherein a plurality of balloons and buoyancy gas reservoir arranged in horizontal rows and vertical columns with each said balloon and buoyancy gas reservoir tethered through a cable to lifting joint to a pull-rod system anchored to said payload vessel, are inflated; and (c) a propulsion system attached to said payload vessel, in accordance with one embodiment of the invention.

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment' or "an embodiment' is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference 13 numbers are re-used to indicate correspondence between referenced elements.

In the following description, for purposes of explanation, numerous specific details are set forth in order to provide a thorough understanding of the present systems and methods. It will be apparent, however, to one skilled in the art that the present apparatus, systems and methods may be practiced without these specific details.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

The air vehicle of this invention includes a payload vessel, wherein the operator and passengers are situated and a control system is placed; a buoyancy lifting system to control vertical movement, and a propulsion system to maneuver horizontal movement. The air vehicle of this invention uses buoyancy force from a plurality of balloons as lifting force and uses propulsion force as driving force to maneuver. The working principle of the air vehicle system of this invention is similar as the working principle of a blimp. The difference is that the air vehicle system of this invention uses a plurality of smaller balloons arranged in an array of columns instead of a single giant balloon. The advantage of this design is that the space the air vehicle system occupies is expanded on the altitude vertical direction and contracted on the horizontal direction, therefore taking less horizontal space as compared to traditional blimp. In addition, it is safer to use a plurality of balloons working together to provide the lifting force as compared to a single giant balloon in a blimp. With the air vehicle of this invention, if one or several balloons fails, it will not cause immediate fall of the air vehicle as other working balloons will still provide lifting forces to prevent quick fall.

In addition, the air vehicle system of this invention uses a compressor pump to pump the buoyancy gas from the inflated balloons back into a buoyancy gas reservoir on board during descending process. Therefore, the buoyancy gas will not be wasted when the air vehicle lands. In this way, the buoyancy gas can be reused in the next operation.

Figure 2:
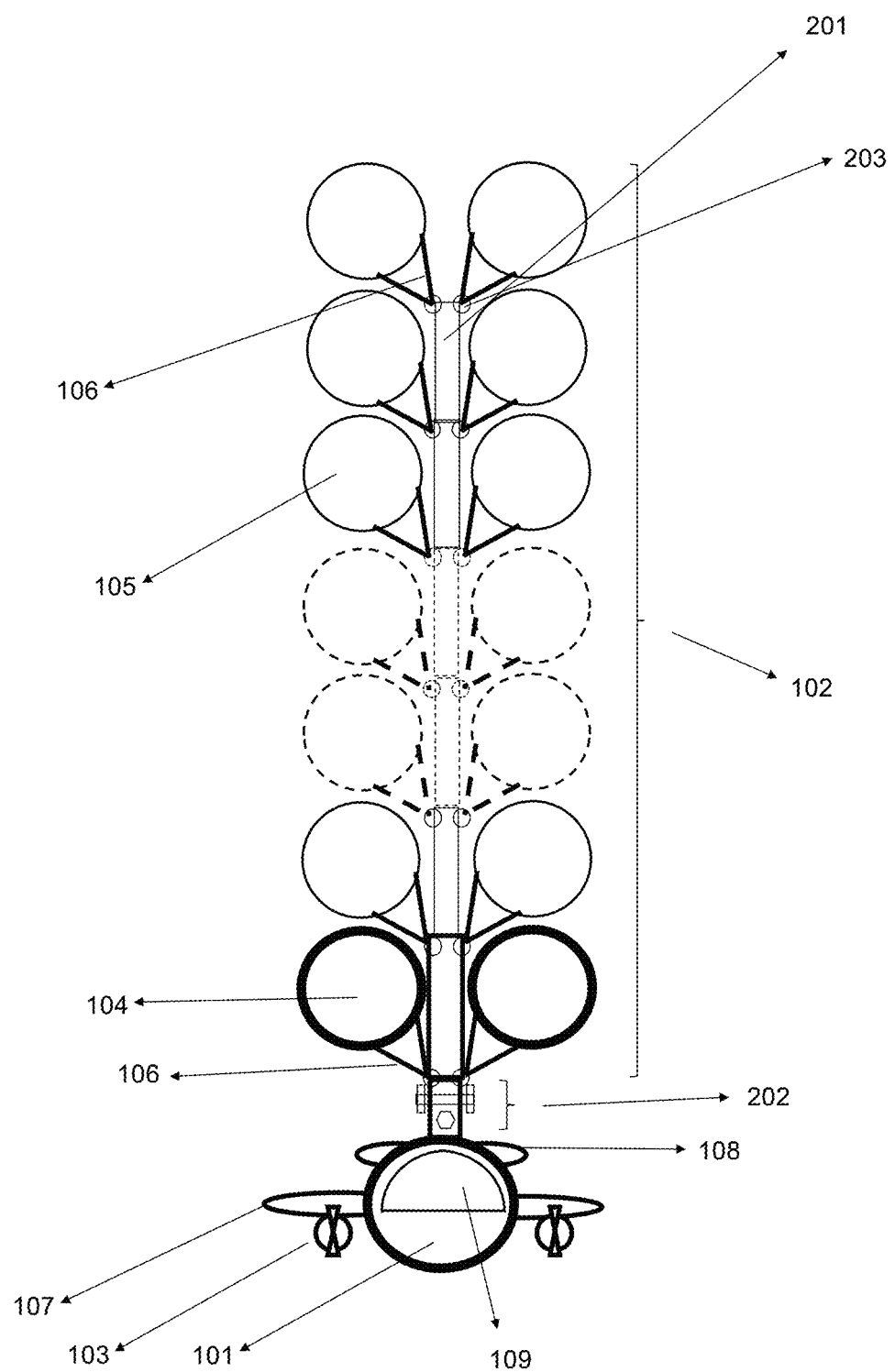
FIG. 2 is a schematic drawing of front view of an air vehicle of the present invention, showing air vehicle with (a) a payload vessel; (b) a buoyancy lifting system, wherein a plurality of balloons and buoyancy gas reservoirs are arranged in horizontal rows and vertical columns with each said balloon and buoyancy gas reservoir tethered through a cable to lifting joint to a pull-rod system anchored to said payload vessel, are inflated; and (c) a propulsion system attached to said payload vessel, in accordance with one embodiment of the invention.

FIGS. 1 and 2 are schematic drawings of side and front views of an air vehicle, showing air vehicle with (a) a payload vessel; (b) a buoyancy lifting system, wherein a plurality of balloons and buoyancy gas reservoir arranged in horizontal rows and vertical columns with each said balloon and buoyancy gas reservoir tethered through a cable to lifting joint to a pull-rod system anchored to said payload vessel, are inflated; and (c) a propulsion system attached to said payload vessel, in accordance with one embodiment of the invention. The air vehicle of this invention includes a payload vessel 101, a buoyancy lifting system 102, and a propulsion system 103 that is attached to the payload vessel 101. The buoyancy lifting system 102 includes a plurality of balloons 105 and buoyancy gas reservoirs 104 arranged in horizontal rows and vertical columns, each balloon 105 and each buoyancy gas reservoir 104 are tethered individually through cables 106 to lifting joints 203 on a pull-rod system 201. The pull-rod system 201 is anchored through anchoring joint 202 onto said payload vessel 101.

The payload vessel 101 is for operator(s) and passenger(s) to reside in. The payload vessel 101 also houses the gas handling system and control system of the air vehicle. The buoyancy lifting system 102 is used for lifting force for the air vehicle. And propulsion system 103 is used for driving force for operator to maneuver the air vehicle in air travel to go forward, make turns, and stop.

As shown in FIGS. 1 and 2, said balloons 105 are at inflated status by the buoyancy gas. When balloons 105 are at inflated status, each balloon 105 will provide its buoyancy force for the whole air vehicle through connected pull-rod system 201. The pull-rod system 201 will extend out at balloon 105 inflated status. Detailed mechanism will be discussed in later paragraph.

Figure 3:
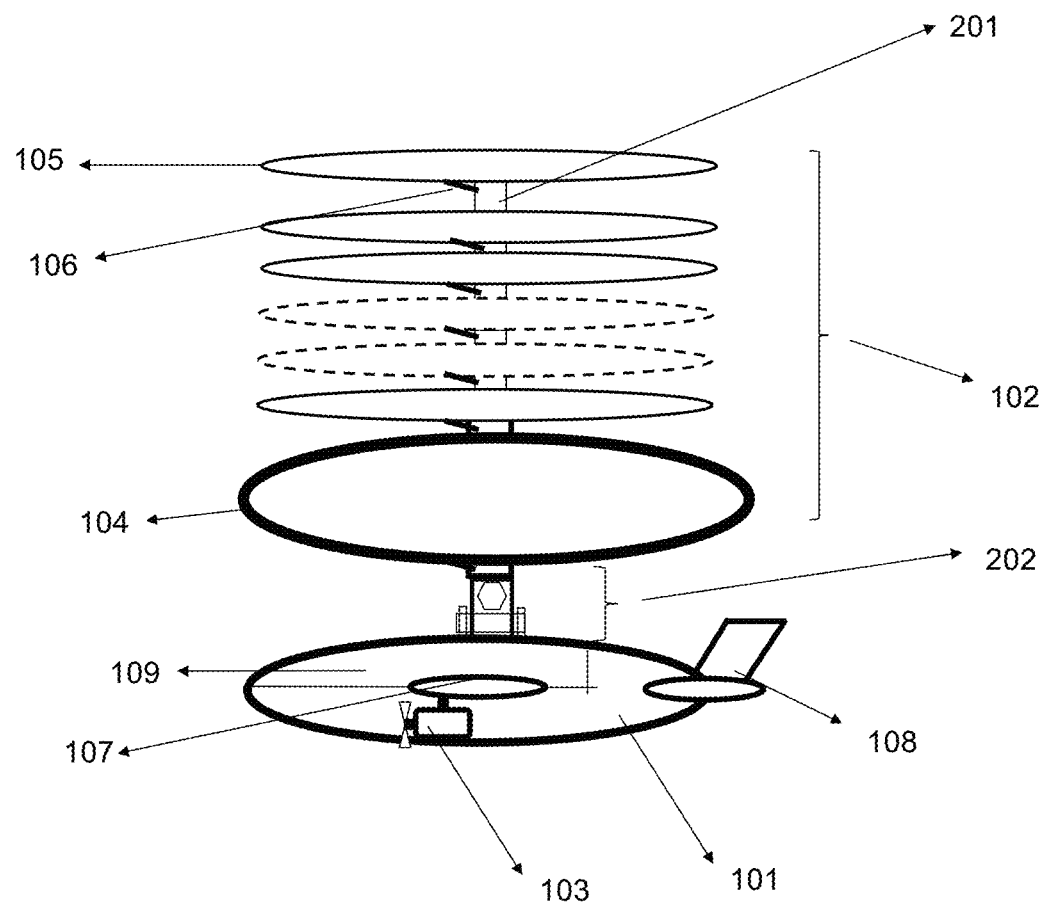
FIG. 3 is a schematic drawing of side view of an air vehicle of the present invention, showing air vehicle with (a) a payload vessel; (b) a buoyancy lifting system, wherein a plurality of balloons and buoyancy gas reservoir arranged in horizontal rows and vertical columns with each said balloon and buoyancy gas reservoir tethered through a cable to lifting joint to a pull-rod system anchored to said payload vessel, are deflated; and (c) a propulsion system attached to said payload vessel, in accordance with one embodiment of the invention.
Figure 4:
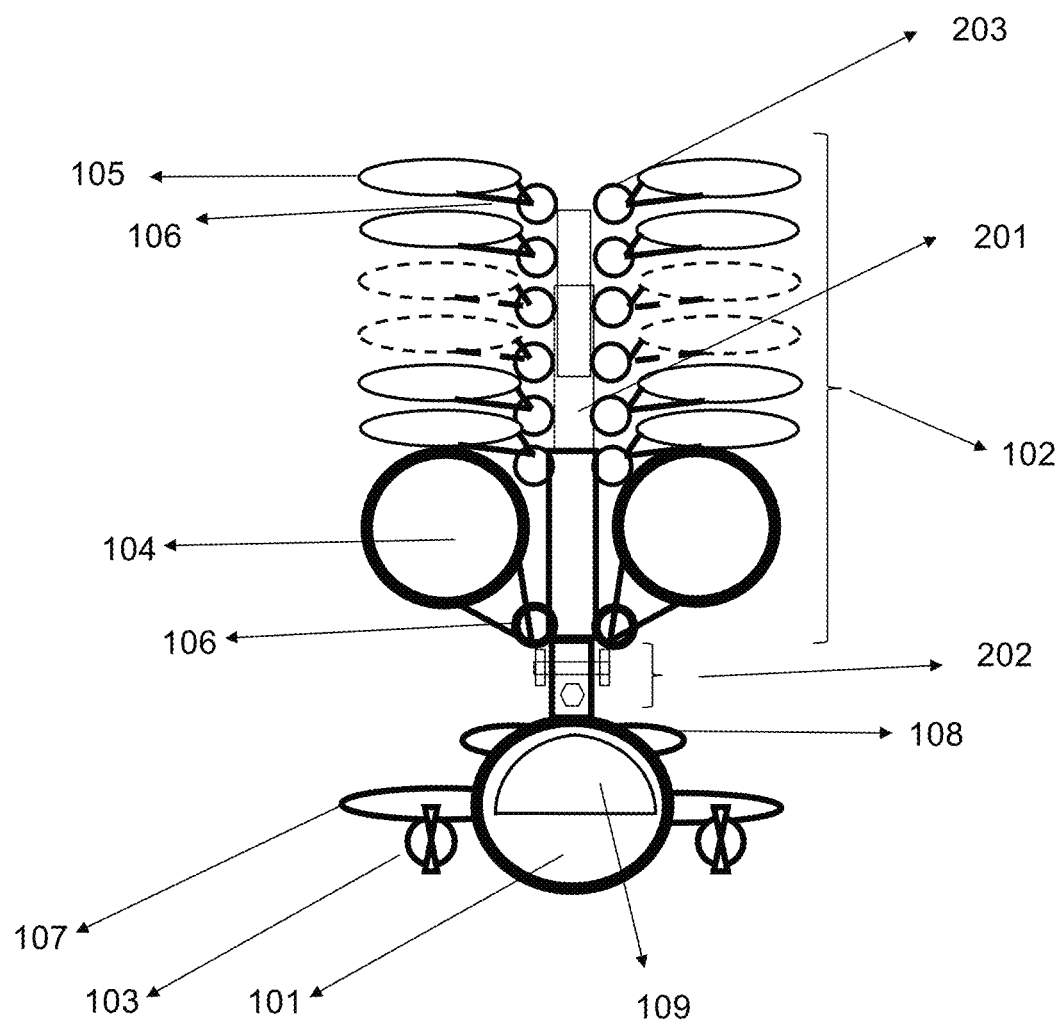
FIG. 4 is a schematic drawing of front view of an air vehicle of the present invention, showing air vehicle with (a) a payload vessel; (b) a buoyancy lifting system, wherein a plurality of balloons and buoyancy gas reservoir arranged in horizontal rows and vertical columns with each said balloon and buoyancy gas reservoir tethered through a cable to lifting joint to a pull-rod system anchored to said payload vessel, are deflated; and (c) a propulsion system attached to said payload vessel, in accordance with one embodiment of the invention.

FIGS. 3 and 4 are schematic drawings of side and front views of an air vehicle, showing air vehicle with (a) a payload vessel; (b) a buoyancy lifting system, wherein a plurality of balloons and buoyancy gas reservoir arranged in horizontal rows and vertical columns with each said balloon and buoyancy gas reservoir tethered through a cable to lifting joint to a pull-rod system anchored to said payload vessel, are deflated; and (c) a propulsion system attached to said payload vessel, in accordance with one embodiment of the invention.

As shown in FIGS. 3 and 4, said balloons 105 are at deflated status when buoyancy gas inside is pumped out back into buoyancy gas reservoir 104. When balloons 105 are at deflated status, each balloon will lose its buoyancy force, and the gravity of the balloon and its associated accessories will cause the pull-rod system 201 to fold up.

Figure 5:
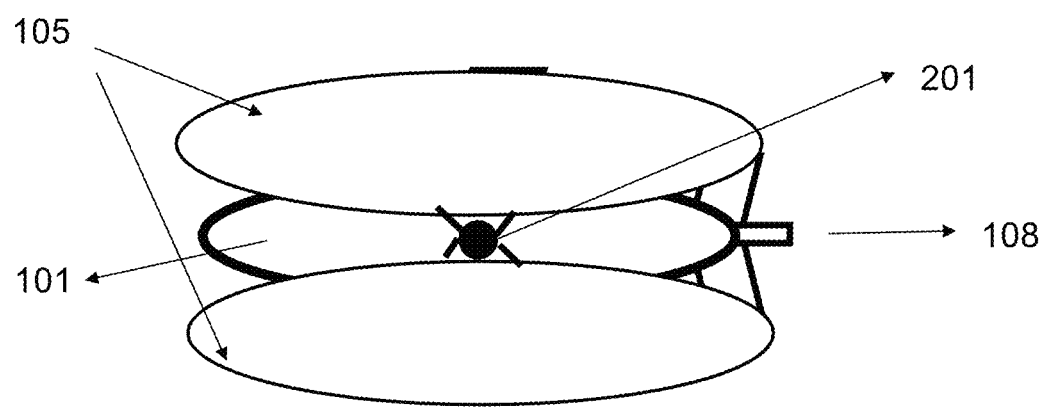
FIG. 5 is a schematic drawing of top view of an air vehicle of the present invention, in accordance with one embodiment of the invention.
Figure 6:
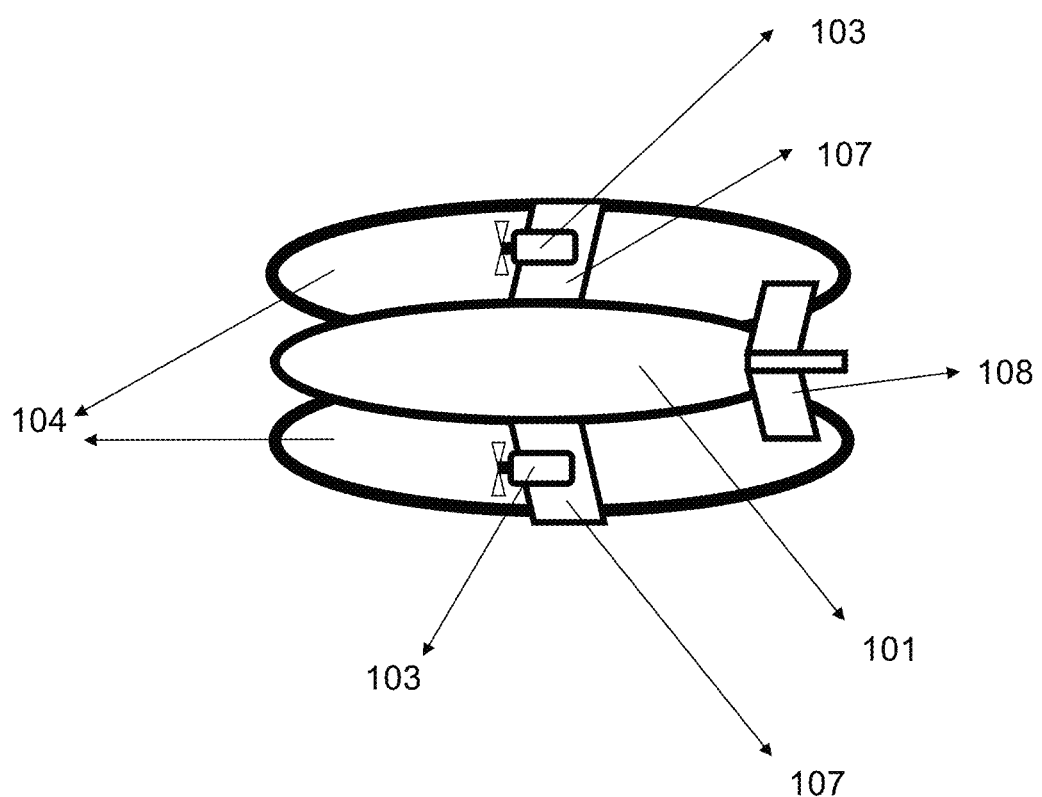
FIG. 6 is a schematic drawing of under view of an air vehicle of the present invention, in accordance with one embodiment of the invention.

FIGS. 5 and 6 are schematic drawings of top and under views of an air vehicle of the present invention, in accordance with one embodiment of the invention.

As shown in FIGS. 1-6, payload vessel 101 includes payload chamber 109, wings 107, tail wings 108, and anchoring joint 202 for pull-rod system 201. The payload chamber 109 is for operator(s) and passenger(s) to reside in. In addition, gas handling system and control system of the air vehicle are housed in the payload vessel 101. The payload vessel 101 have wings 107 and tail wings 108 for stabilization of air vehicle during movement. Pull-rod system anchoring joint 202 is mounted on top of the payload vessel. Detailed structure will be discussed in later paragraph.

Propulsion system 103 includes a pair of engines and blades for propulsion force, electrical power system, control system and its necessary accessories. With the control of propulsion forces by both engines, the air vehicle can be controlled to go forward, make turns and stop. For example, when both engines provide the same propulsion forces, the air vehicle will go forward straight. And the speed of the air vehicle can be controlled by the magnitude of propulsion forces generated by the engines. When left engine and right engine generate different propulsion forces, the air vehicle will start to make turns. For example, higher left-side propulsion force will make air vehicle to turn right, and higher right-side propulsion force will make air vehicle to turn left. When both engines stop, the air vehicle will stop in air. The ability of air vehicle to sit still in the air sometimes is a desired feature as compared to common air plane which cannot stop in air. And compared to helicopter, although both helicopter and air vehicle can sit still in air, air vehicle will not consume energy in such status and can stay still for as long as desired.

FIGS. 1-6 show air vehicle with one pull-rod system together with said columns and rows of balloons and buoyancy gas reservoir attached. It may be appreciated to a person with ordinary skill in the art that air vehicle of this invention can have a plurality of such pull-rod systems anchored at proper location of said payload vessel based on designed assembly and weight.

Figure 7:
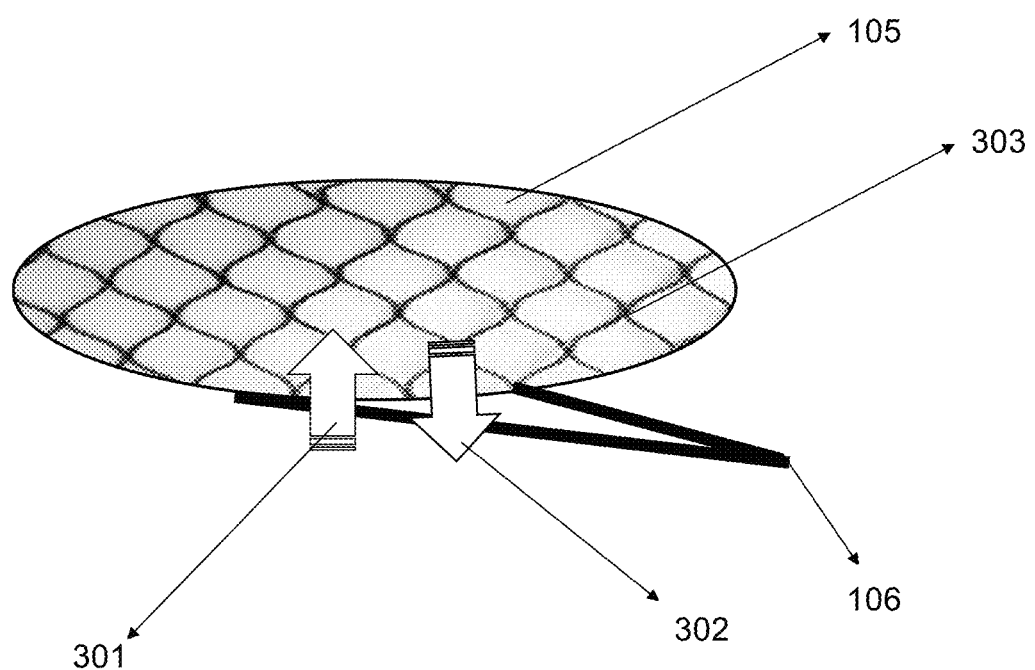
FIG. 7 is a schematic drawing of an individual balloon and its accessory constituent, in accordance with a preferred embodiment of the invention.

FIG. 7 is a schematic drawing of an individual balloon and its accessory constituent, in accordance with a preferred embodiment of the invention. The balloon 105 contains a body to store buoyancy gas, an inlet check valve 301 and an outlet check valve 302. The balloon 105 is wrapped by a woven net 303, and one or several cables 106 tied to the woven net 303 will be tethered to the lifting-joint 203 on said pull-rod system 201. Said woven net 303 is made from light weight fabric material and is designed to provide the mechanical strength to support said balloon 105 during the lifting process. The balloon body can be made from light weight, no or little buoyancy gas permeable materials, such as polymeric materials nylon, PVC, PE, etc. The shape of balloon body is aerodynamically-shaped to reduce resistance from air during movement in air.

Figure 8:
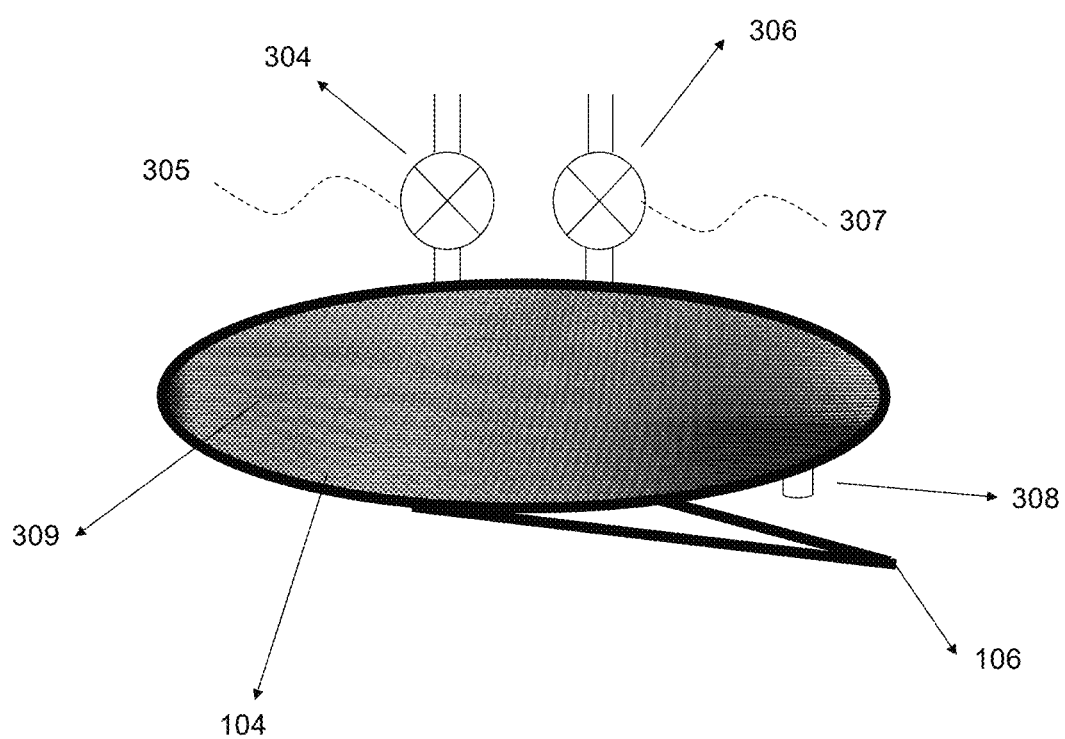
FIG. 8 is a schematic drawing of an individual buoyancy gas reservoir and its accessory constituent, in accordance with a preferred embodiment of the invention.

FIG. 8 is a schematic drawing of an individual buoyancy gas reservoir and its accessory constituent, in accordance with a preferred embodiment of the invention. Said buoyancy gas reservoir 104 contains a body for storing buoyancy gas, an outlet electrically actuated valve 304 with electrical cable 305 connected to control system, an inlet electrically actuated valve 306 with electrical cable 307 connected to control system, a pressure safety relief valve 308. Both valves 304 and 305 are connected through tubing to gas handling system. The buoyancy gas reservoir 104 is wrapped and protected by mesh wire shell 309. The mesh wire shell 309 is designed to provide the mechanical strength needed to sustain high buoyancy gas pressure in the buoyancy gas reservoir 104. One or several cables 106 tied to the outside mesh wire shell are tethered to the lifting-joint 203 on said pull-rod system 201. The mesh wire shell 309 for the buoyancy gas reservoir 104 should be made of strong mechanical strength materials such as steel, carbon fiber, etc. The mesh size of the mesh wire shell should be 100 or higher to protect the buoyancy gas reservoir body. The balloon body can be made from light weight, no or little buoyancy gas permeable materials, such as polymeric materials nylon, PVC, PE, etc. The shape of buoyancy gas reservoir is aerodynamically-shaped to reduce resistance from air during movement in air.

Figure 9:
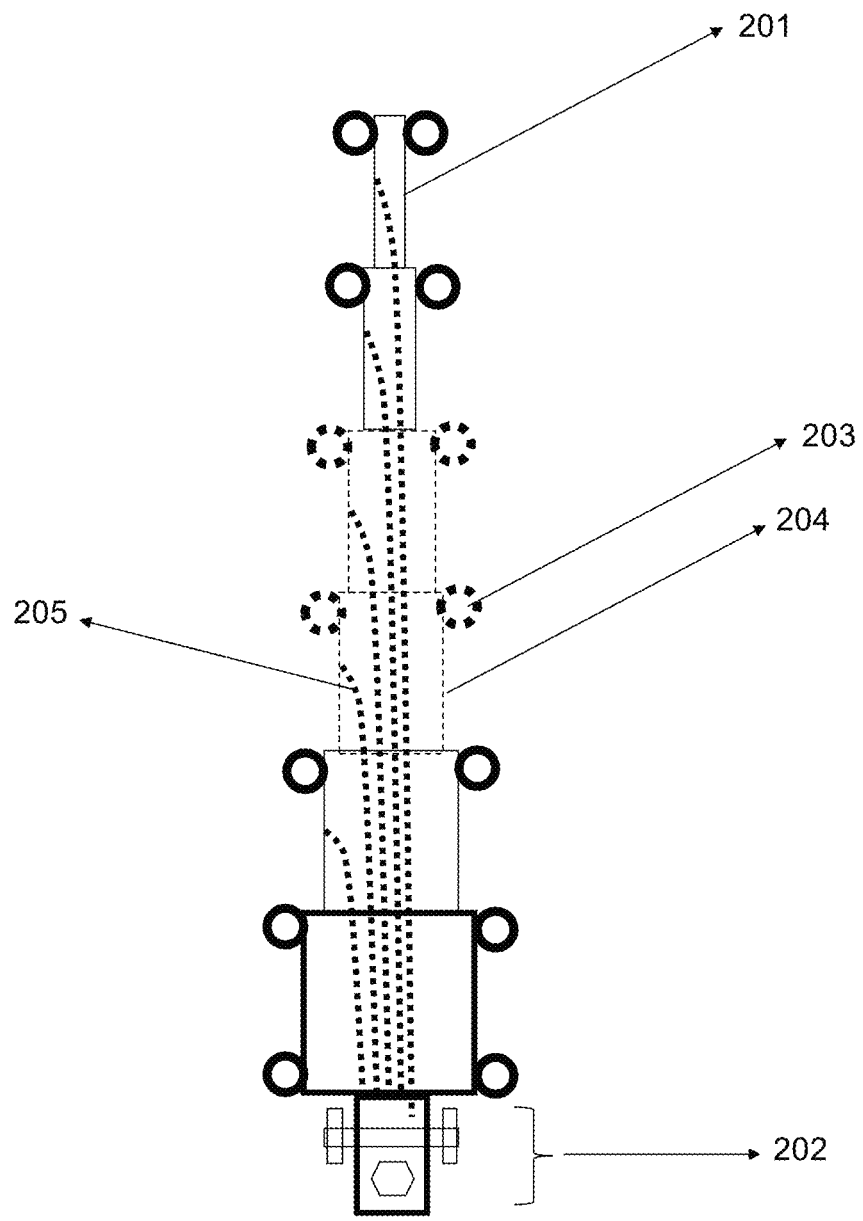
FIG. 9 is a schematic drawing of extended status of a pull-rod system anchored on the payload vessel of an air vehicle, in accordance with one embodiment of the invention.

FIG. 9 is a schematic drawing of extended status of a pull-rod system anchored on said payload vessel 101 of an air vehicle, in accordance with one embodiment of the invention. Said pull-rod system 201 comprises a plurality of nested rod segments 204, and each nested rod segment 204 comprises lifting joint 203. The nested rod segments 204 are hollow shaped, and a flexible cable 205 is mounted inside of each segment and connected to the anchoring joint 202. The anchoring joint 202 is mounted on said payload vessel 101. The nested rod segments 204 will extend out by the buoyancy force from said balloon 105 when said balloon 105 is inflated. Said pull-rod system 201 is bolted to said anchoring joint 202, and said pull-rod system 201 can swing back and forth, left and right with a small angle when there is a torque on said pull-rod system 201. The torque is usually resulted from air resistance force exerted on said balloons.

Figure 10:
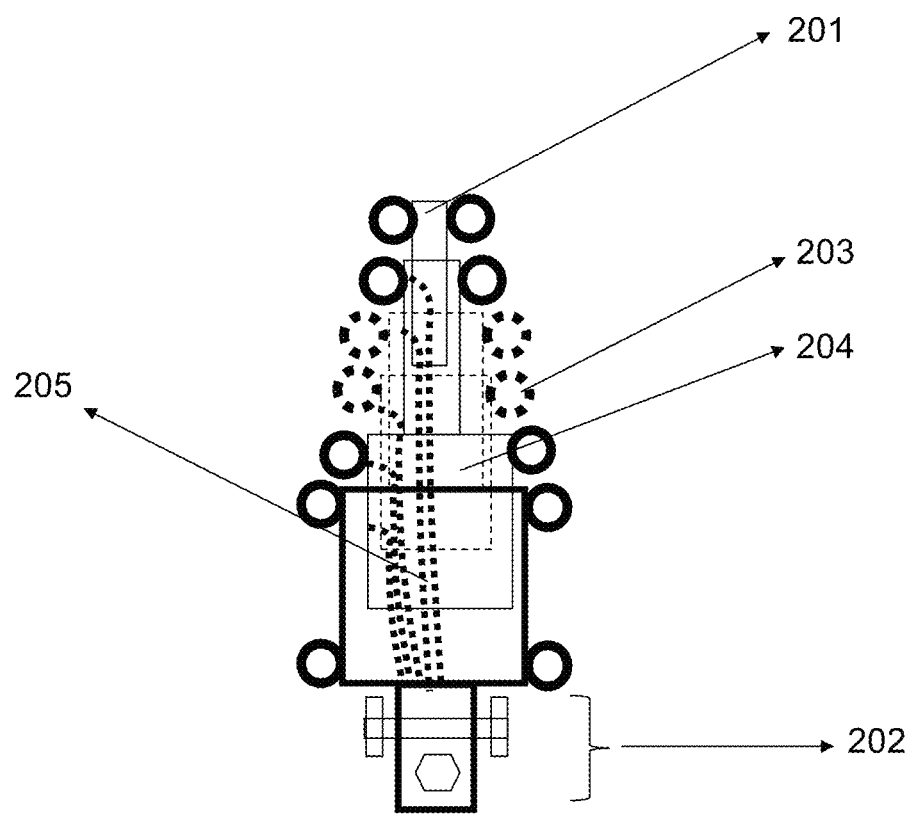
FIG. 10 is a schematic drawing of folded status of a pull-rod system anchored on the payload vessel of an air vehicle, in accordance with one embodiment of the invention.

FIG. 10 is a schematic drawing of folded status of a pull-rod system anchored on said payload vessel 101 of an air vehicle, in accordance with one embodiment of the invention. The nested rod segments 204 will fold up by the gravity of said balloon 105 and its accessory constitutes when said balloon 105 is deflated and lose its buoyancy force.

Figure 11:
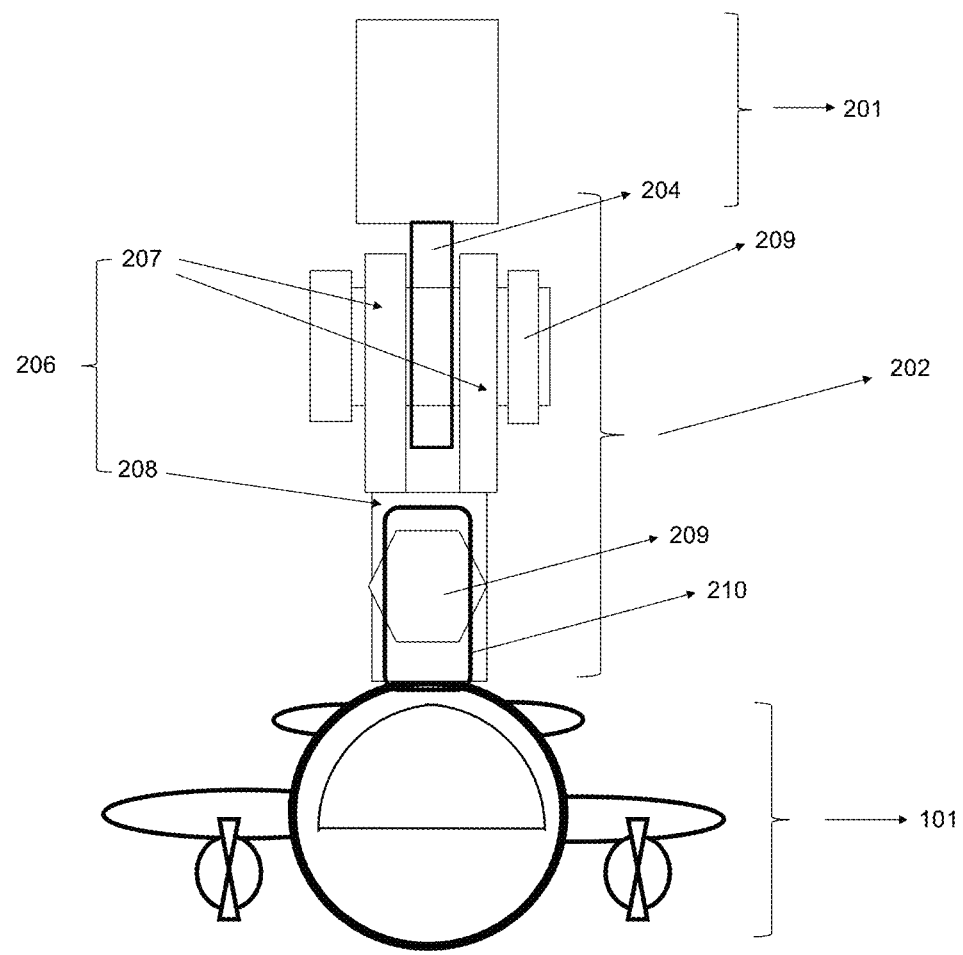
FIG. 11 is a schematic drawing of front view of an anchoring structure of a pull-rod system anchored on a payload vessel, in accordance with one preferred embodiment of the invention.
Figure 12:
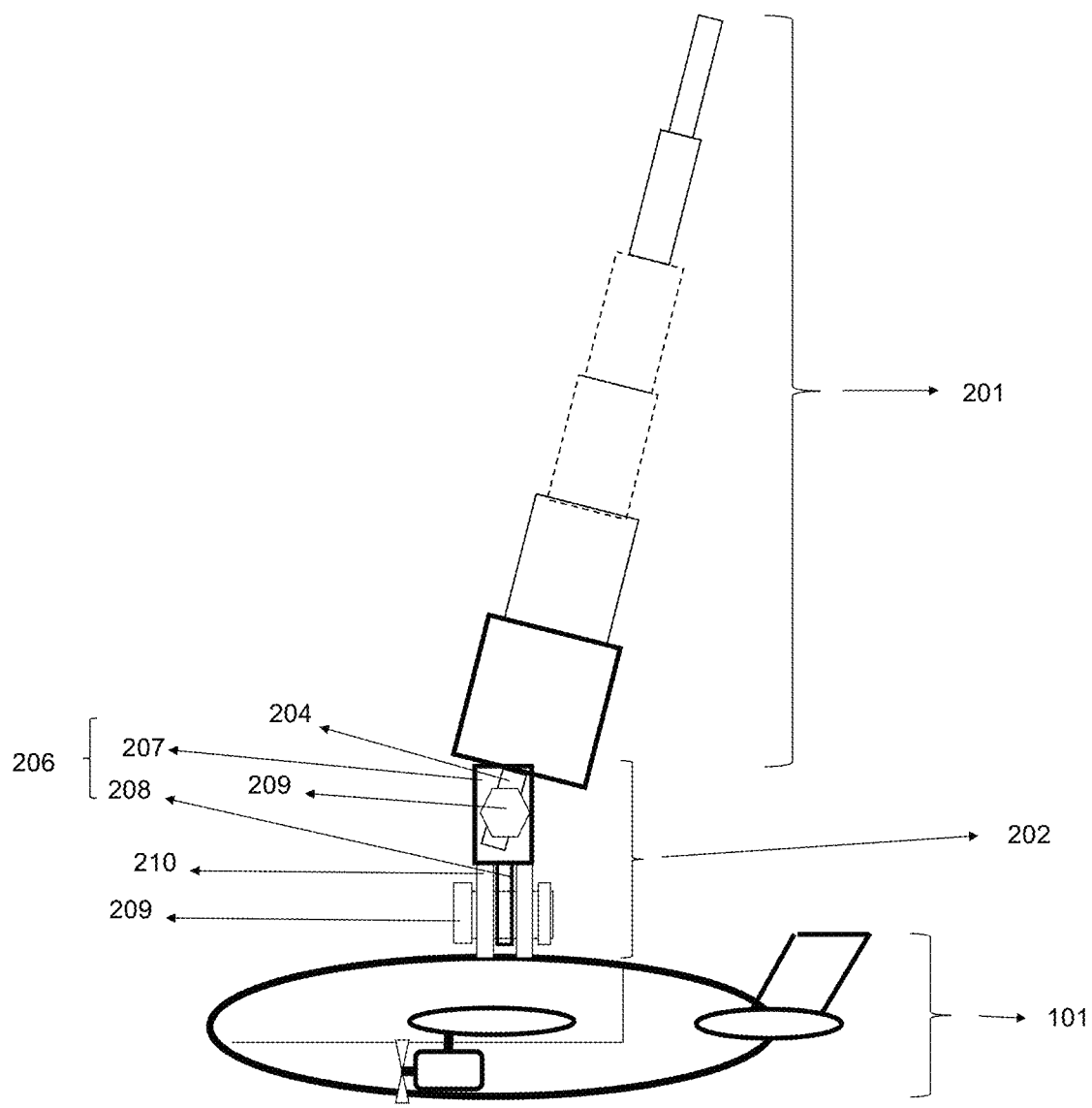
FIG. 12 is a schematic drawing of side view of an anchoring structure of a pull-rod system anchored on a payload vessel when there is a torque on pull-rod system, in accordance with one preferred embodiment of the invention.

FIGS. 11 and 12 are schematic drawings of front view and side view of an anchoring joint 202 of a pull-rod system 201 anchored on a payload vessel 101, in accordance with one preferred embodiment of the invention. There are two parallel anchoring stands 210 mounted on payload vessel 101. The anchoring stands 210 have holes in them. A swing stand 206 has two parallel plates 207 with a vertical footing 208 mounted onto said parallel plates 207 in the middle position and at a 90-degree angle to said parallel plates 207. Both parallel plates 207 and footing 208 have holes in them. The footing 208 of said swing stand 206 is bolted onto said anchoring stands 210 by a bolt 209 through the holes. There is a footing plate 204 on said pull-rod system 201, and footing plate 204 also has a hole in it. Said pull-rod system 201 is bolted through footing plate 204 onto said parallel plates 207 of said swing stand 206 by bolt 209.

The design structure of anchoring joint 202 of this invention will allow pull-rod system 201 to swing back and forth, and/or left and right with an angle when there is a torque exerted on it. As air vehicle moves in the air, the propulsion system will push payload vessel forward. The payload vessel will pull said pull-rod system and buoyancy system with it. The resistance of air will drag said balloons backwards, creating a torque. With this design, said pull-rod system will swing backward by the torque with a small angle to the vertical position, relieving the stress on the extended pull-rod system and the joint connection.

With the similar purpose to relief stress exerted on said pull-rod system, other design that allows said pull-rod system to swing can be used as well.

Figure 13:
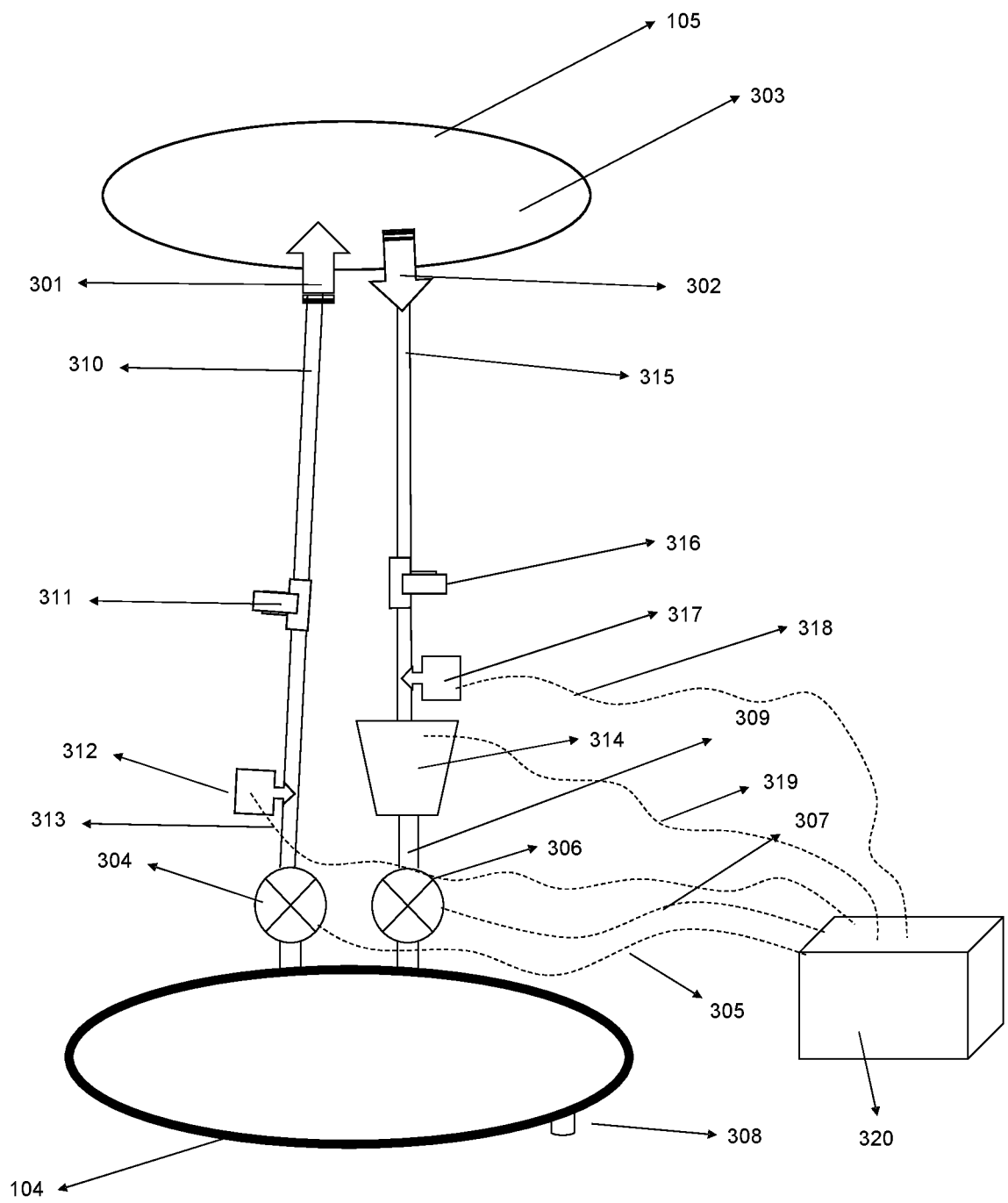
FIG. 13 is a schematic drawing of buoyant gas handling system and control system which connect the balloons and buoyancy gas reservoirs and direct the flow of buoyancy gas, in accordance with one embodiment of the invention.

FIG. 13 is a schematic drawing of buoyancy gas handling system and control system which connect the balloons and buoyancy gas reservoirs and direct the flow of buoyancy gas, in accordance with one embodiment of the invention. In said buoyancy gas handling system, buoyancy gas reservoir 104 outlet electrically actuated valve 304 is connected through tubing 310 to balloon 105 inlet check valve 301. Tubing 310 has multiple split tubing through joint T 311 leading to other balloon's inlet check valve. In inlet line 310, there is a pressure gauge 312 with electrical cable 313 connected to control system. Buoyancy gas reservoir 104 inlet electrically actuated valve 306 is connected to the outlet of a compressor pump 314, and the inlet of compressor pump 314 is then connected through tubing 315 to balloon 105 outlet check valve 302. Compressor pump 314 is connected to control system 320 by electrical cable 319. Tubing 315 has multiple split tubing through joint T 316 leading to other balloon's outlet check valve. In outlet line 315, there is a pressure gauge 317 with electrical cable 318 connected to control system. The electrical cables of electrically actuated valves, signal cables of pressure gauges, and power cord of compressor pump are all connected to the control system 320.

When the command is to ascend the air vehicle, said control system 320 will send signal to open said buoyancy gas reservoir 104 outlet electrically actuated valve 304 to inflate said balloons 105 by gas expansion. When the air vehicle reaches targeted altitude, said control system 302 will send signal to close valve 304. As balloons 105 is inflated, each balloon 105 will generate a lifting force for the whole air vehicle, and pull-rod system 201 will expand along with it by the buoyancy force. When the command is to descend the air vehicle, the control system 320 will send signal to open buoyancy gas reservoir 104 inlet electrically actuated valve 306, and start the compressor pump 314 to deflate said balloons 105 by extracting buoyancy gas out of said balloon 105. In the process of extracting buoyancy gas out of balloons 105, the pressure inside tubing 315 will decrease to sub-atmosphere pressure by the work of compressor pump 314, and the air pressure in the atmosphere will press buoyancy gas out of balloon 105. As balloon 105 start to deflate, the volume of balloon 105 will decrease and the buoyancy force by the balloons will decrease. As the volume of balloon 105 continues to decrease gradually, the air vehicle will descend accordingly. And pull-rod system 201 will start to fold up along with it by the gravity. When said air vehicle lands, there could still be some buoyancy gas left inside said balloons 105. At this time, the control system can be connected to a land power supply for the rest of pumping process. The battery system can also be recharged at landing status.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Compared to prior art as in U.S. Pat. No. 6,648,272, the advantage of this invention is to use a plurality of buoyancy gas reservoirs of large volume similar to an individual balloon and shape of aerodynamically-shaped. In this way, the gas pressure of buoyancy gas inside buoyancy gas reservoir is relatively lower as compared to a smaller buoyancy gas reservoir at landing status. In thermodynamics theory, it will consume more energy to pump a gas to a higher pressure than to a lower pressure. With the use of large volume buoyancy gas reservoir, the compressor pump will consume a lot less energy during the compressing process. In addition, lower buoyancy gas pressure will reduce the mechanical strength requirement of the buoyancy gas reservoir and will allow the use of less and lighter materials for the build of buoyancy gas reservoir. In a preferred embodiment, the maximum buoyancy gas pressure in the buoyancy gas reservoir is less than 10 atm, reducing significantly the mechanical strength requirement for buoyancy gas reservoir. The pressure safety relief valve on the buoyancy gas reservoir will ensure the buoyancy gas pressure not exceeding the designed pressure and preventing rupture of the buoyancy gas reservoir.

As compared to all buoyancy assisted air vehicle such as blimp, hot air balloon, a major advantage of this invention is the volume of the air vehicle of this invention can be packed to a very small volume in landed storage status. Therefore, it will take up much smaller space for parking the air vehicle of this invention as compared to conventional air vehicles.

The air vehicle of this invention can also be easily designed to suit for various purpose of application with respect to weight requirement. For example, for personal travel application, the number of balloons and the size of the balloons can be reduced to match the total weight requirement of the air vehicle. For heavier loads, the number of balloons and the size of the balloons can be increased to match the weight requirement.

Because of the easy control of the buoyancy force of the balloons, the altitude of the air vehicle can be easily controlled with the control of buoyancy gas handling system.

One of the most important advantage of the air vehicle of this invention is the safety feature of this air vehicle. Since the lifting force is contributed by a plurality of balloons, even if one or several balloons should suffer a rupture, other balloons should still provide the lifting force to the whole air vehicle and make the drop of air vehicle very slow. The slow descending of the air vehicle can be easily controlled for a safe landing. The chance of all the balloons to fail at the same time is very low as compared to one balloon to fail. This feature provides the much improved safety of this air vehicle.

What is claimed is:

1. An air vehicle, comprising:
   a payload vessel;
   a propulsion system;
   a gas handling system, wherein said gas handling system comprises tubing, valves, pressure sensors, and pumps;
   a buoyancy lifting system anchored to said payload vessel;
   said buoyancy lifting system comprising:
   a) a plurality of balloons containing buoyancy gas, arranged in horizontal rows and vertical columns, each balloon of said plurality of balloons tethered through a cable to a lifting-joint mounted on a pull-rod system;
   b) a plurality of buoyancy gas reservoirs containing buoyancy gas, arranged in horizontal rows and vertical columns, each buoyancy gas reservoir of said plurality of buoyancy gas reservoirs tethered through a cable to a lifting-joint mounted on a pull-rod system;
   c) a control system directing buoyancy gas flows between said plurality of balloons and said plurality of buoyancy gas reservoirs;
   said control system controls said air vehicle to ascend through directing buoyancy gas flow from said plurality of buoyancy gas reservoirs into said plurality of balloons, and to descend through directing buoyancy gas flow from said plurality of balloons into said plurality of buoyancy gas reservoirs;

said pull-rod system extends out by buoyancy force when said plurality of balloons are inflated and folds up by gravity when said plurality of balloons are deflated.

2. The air vehicle of claim 1, wherein said payload vessel comprises said control system and a payload chamber, wherein said payload chamber houses operators and passengers.

3. The air vehicle of claim 1, wherein said payload vessel is aerodynamically-shaped to reduce air resistance during movement and has wings for stabilization of said air vehicle.

4. The air vehicle of claim 1, wherein said plurality of balloons and said plurality of buoyancy gas reservoirs are aerodynamically-shaped to reduce air resistance during movement.

5. The air vehicle of claim 1, wherein said balloon is wrapped by a woven fiber net, wherein the mechanical strength of said woven fiber net bears the buoyance force by said balloon when said balloon is fully inflated and said cable is tethered to said woven fiber net.

6. The air vehicle of claim 1, wherein said buoyancy gas reservoir is wrapped by a woven mesh screen, wherein the mechanical strength of said woven mesh screen bears a gas pressure of at least 10 atmospheric pressure inside said buoyancy gas reservoir and said cable is tethered to said woven mesh screen.

7. The air vehicle of claim 1, wherein the buoyancy gas pressure inside said buoyancy gas reservoir is not greater than 10 atmospheric pressure.

8. The air vehicle of claim 1, wherein said gas handling system, said control system, and said propulsion system are powered by an electrical power system.

9. The air vehicle of claim 1, wherein said balloon contains a check valve connecting to a buoyancy gas inlet line, allowing buoyancy gas to only enter said balloon; and a second check valve connecting to a buoyancy gas outlet line, allowing buoyancy gas inside said balloon to only exit said balloon.

10. The air vehicle of claim 9, wherein said buoyancy gas is administrated into said plurality of balloons via said buoyancy gas inlet line by gas expansion from said plurality of buoyancy gas reservoirs at gas pressure; and said buoyant gas is extracted from said balloon back into said plurality of buoyancy gas reservoirs via said buoyancy gas outlet line by said pumps in said gas handling system.

11. The air vehicle of claim 1, wherein said buoyancy gas reservoir contains an electrically actuated valve controlling buoyancy gas to exit said buoyancy gas reservoir, and a second electrically actuated valve controlling buoyancy gas to enter said buoyancy gas reservoir, and a pressure safety relief valve to prevent buoyancy gas pressure inside said buoyancy gas reservoir from going above a designed gas pressure.

12. The air vehicle of claim 1, wherein said propulsion system comprises a plurality of electric motors with propulsion propellers to move said air vehicle forward and make turns horizontally.

13. The air vehicle of claim 1, wherein said buoyancy gas comprises helium gas, or hydrogen gas, or a combination thereof.

14. The air vehicle of claim 1, wherein said pull-rod system comprises a plurality of nested hollow shaped rods, wherein each said nested hollow shaped rod of the plurality of nested hollow shaped rods has lifting-joints mounted on said nested hollow shaped rod.

15. The air vehicle of claim 1, wherein said pull-rod system is anchored vertically on the top of said payload vessel through an anchoring joint, and said anchoring joint is constructed to allow said pull-rod system to swing in forward-backward and left-right directions.

16. A method of operating an air vehicle comprising:
providing the air vehicle, said air vehicle comprising:
a payload vessel;
a propulsion system;
a gas handling system, wherein said gas handling system comprises tubing, valves, pressure sensors, and pumps;
a buoyancy lifting system anchored to said payload vessel;
said buoyancy lifting system comprising:
a) a plurality of balloons containing buoyancy gas arranged in horizontal rows and vertical columns, each balloon of said plurality of balloons tethered through a cable to a lifting-joint mounted on a pull-rod system;
b) a plurality of buoyancy gas reservoirs containing buoyancy gas, arranged in horizontal rows and vertical columns, each buoyancy gas reservoir of said plurality of buoyancy gas reservoirs tethered through a cable to a lifting-joint mounted on said pull-rod system;
c) a control system directing buoyancy gas flows between said plurality of balloons and said plurality of buoyancy gas reservoirs;
moving said air vehicle in a vertical direction with said control system by controlling said air vehicle to ascend through directing buoyancy gas flow from said plurality of buoyancy gas reservoirs into said plurality of balloons, and to descend through directing buoyancy gas flow from said plurality of balloons into said plurality of buoyancy gas reservoirs;
moving said air vehicle in a horizontal direction with said propulsion system.

* * * * *